United States Patent [19]

Haines

[11] Patent Number: 4,886,181

[45] Date of Patent: Dec. 12, 1989

[54] PLASTICS CONTAINER ASSEMBLY

[75] Inventor: Peter R. Haines, Skelmersdale, Great Britain

[73] Assignee: Lin Pac Mouldings Limited, Birmingham, United Kingdom

[21] Appl. No.: 107,786

[22] Filed: Oct. 9, 1987

[30] Foreign Application Priority Data

Oct. 13, 1986 [GB] United Kingdom ................ 8624533
Feb. 4, 1987 [GB] United Kingdom ................ 8702459

[51] Int. Cl.$^4$ ............................................. B65D 6/00
[52] U.S. Cl. .................................. 220/67; 220/81 R; 220/308
[58] Field of Search ................... 220/66, 67, 81 R, 75, 220/76, 306, 307, 308, 354–359, 378

[56] References Cited

U.S. PATENT DOCUMENTS

| 3,193,132 | 7/1965 | Gray | 220/307 |
|---|---|---|---|
| 3,406,891 | 10/1968 | Buchner et al. | 220/67 |
| 3,843,016 | 10/1974 | Bornhorst et al. | 220/306 |
| 3,952,904 | 4/1976 | Verlinden | 220/67 |
| 4,201,306 | 5/1980 | Dubois et al. | 220/319 |
| 4,308,970 | 1/1982 | Von Holdt | 220/307 |
| 4,355,759 | 10/1982 | Amberg | 220/359 |
| 4,453,646 | 6/1984 | Harrild | 220/307 |
| 4,799,602 | 1/1989 | Collins et al. | 220/307 |

FOREIGN PATENT DOCUMENTS

| 0210667 | 10/1957 | Australia | 220/66 |
|---|---|---|---|
| 1098217 | 7/1955 | France | 220/307 |
| 1211959 | 3/1960 | France | 220/306 |
| 0571416 | 1/1958 | Italy | 220/67 |
| 0264556 | 10/1949 | Switzerland | 220/67 |

Primary Examiner—Jimmy G. Foster

[57] ABSTRACT

A plastics container assembly has a tubular wall 1 and a bottom end cap 2 fitted thereto to form a base. The wall 1 has an internal flexible and integral peripheral sealing flange 7 which is displaced by abutment with a closure wall 2a during fitting of the end cap to the side wall so that an annular rib 8 on the cap snap engages with an annular groove 5 in the side wall. A flange 12 on the bottom cap overlies the bottom end of the side wall 3 and may be permanently bonded thereto by welding. The flange 7 presents a smoothly curved concave profile 13 and provides a smooth transition 14 with the closure wall 2a.

Fluid seals are provided by abutting surfaces between the rib 8 and groove 5, between the flange 12 and bottom of the wall 1 and between the sealing flange 7 and wall 2a.

In a modification the annular rib is located on the wall 1 to snap engage with an annular groove in the cap 2 and the sealing flange 7 is omitted so that the smoothly curved concave profile is formed by an upward extension wall of the bottom cap 2.

19 Claims, 3 Drawing Sheets

PLASTICS CONTAINER ASSEMBLY

TECHNICAL FIELD & BACKGROUND ART

The present invention relates to a plastics container assembly and is particularly concerned with containers having a base and an upstanding side wall and which are usually generally cylindrical in form and suitable for the marketing and storage of fluid such as paint. Paint containers of plastics are well known and are usually discarded when their contents are exhausted. For this reason it is important that the containers should be capable of inexpensive manufacture and of a structure which alleviates leakage of the fluid. This is particularly so where containers are formed as an assembly from a tubular wall and a base which is fitted thereto. Being of plastics, containers of this latter type can absorb quite severe shock forces, for example if dropped, and in these circumstances it is important for the base to be connected to the side wall in a manner which provides a fluid seal that is likely to be maintained during the application of reasonable shock forces to the container. It is an object of the present invention to provide a plastics container assembly having an upstanding side wall and a base fitted thereto which is sealed in a manner that alleviates leakage of fluid from the container when the container is subjected to reasonable shock forces and in which the fitting of the base to the side wall can be achieved relatively inexpensively and simply.

STATEMENT OF INVENTION & ADVANTAGES

According to the present invention there is provided a plastics container assembly having an upstanding side wall and a base and which consists of a tubular wall part and a base closure part fitted to a bottom end of the wall part; one of said parts having a peripheral rib and the other part having a peipheral groove within which the rib broken, for example by dropping the container onto a corner of its base, an effective fluid seal should be maintained as previously discussed. The peripheral flange, which may be external and located on the closure part to overlie the bottom end face of the wall part, or may be internal and located on the wall part to overlie a bottom end face of the closure part, may provide a bottom on which the container can stand. With the aforementioned arrangement in which the wall part overlies an external peripheral flange on the closure part it will be appreciated that several containers may be stacked one on top of another so that the load is accommodated through the container side walls and peripheral flanges to bias those flanges into abutment with the faces which they overlie and thereby maintain fluid seals in the stack.

Preferably the base closure part has a flat bottom wall which extends over the bottom of the interior of the container, usually perpendicularly to the side wall of the container, and the peripheral rib and groove engage in the plane of the bottom wall. In this latter arrangement it is also preferred that the peripheral rib is located on the tubular wall part with the peripheral groove formed in the closure part in the plane of the bottom wall of that part, in this way efficient usage can be made of the plastics material of the closure part without unnecessarily weakening either the closure part or the tubular wall part.

The smoothly curved concave profile presented at the effective peripheral junction within the container between the base and the side wall may facilitate complete removal of the container contents for example paint, by brush since it will alleviate paint from becoming trapped in the corner at the bottom of the container (as frequently occurs with conventional paint cans). This curved concave profile may be formed by either or both of the inner surfaces of the tubular wall part and the base closure part. In one form is received to provide a fluid seal; one of said parts having a peripheral flange which closely overlies a peripheral bottom end face of the other part, and wherein inner surfaces of the wall part and closure part provide a smooth transition from one surface to the other and the effective peripheral junction within the container between the base and the side wall presents a smoothly curved concave profile.

By the present invention it is envisaged that a relatively tight fit of the peripheral groove with the rib between the tubular wall part and the base closure part and also between the peripheral flange on one part and the bottom end face of the other part which it overlies will provide an effective seal to retain fluid within the container. The tubular wall part will normally be open topped and fitted with a removable id for storage of, for example, paint. It will also be appreciated that the close proximity between the inner surfaces of the wall part and closure part in providing the smooth transition between those surfaces can also serve as a fluid seal. In each instance the fluid seal which is formed should permit some flexibility between the wall part and closure part to accommodate reasonable shock forces on the container without causing sufficient disruption in all of the seals to permit fluid leakage. To provide and maintain the aforementioned tightness between the cooperating peripheral groove and rib it is preferred that the peripheral rib is in snap engagement with the groove.

A further preference is that the wall part and closure part are permanently bonded together, for example by an adhesive or welding. This bonding is conveniently achieved between the peripheral flange and the bottom end face which that flange overlies., This permanent bonding will provide an additional fluid seal between the closure part and wall part but in the event that the bond is of construction the closure part may have a tubular extension wall which extends upwardly from a bottom wall of that part within and adjacent to the tubular wall part, preferably so that the upward tubular extension presents the smoothly curved concave profile and is received within a peripheral recess in the tubular wall to provide the smooth transition between the inner surfaces of the wall part and the closure part. In a further construction the tubular wall part may have an internal peripheral sealing flange adjacent to the closure part and which is directed from the side wall downwardly to the closure part so that the sealing flange abuts the closure part to provide a fluid seal, to form the smooth transition between the inner surfaces of the wall part and the closure part and to present at least part of the smoothly curved concave profile. The aforementioned peripheral sealing flange may be flexible, for example so that it is displaced by engagement with the closure part during fitting of the closure part to the tubular wall part and the resilience of the plastics material will urge the sealing flange into abutment with the closure part to maintain the fluid seal. Where a peripheral sealing flange is provided as aforementioned, such a flange may form a peripheral recess beneath it in the tubular wall part so that an upwardly extending tubular extension wall of the closure part is received within the peripheral recess, preferably in complementary manner with the sealing flange overlying the upward extension wall.

It is envisaged that the plastics material from which the container of the present invention is constructed will be of a semi-rigid nature such as polypropylene.

DRAWINGS

Embodiments of the present invention will now be described, by way of example only, with reference to the accompanying illustrative drawings, in which:

FIG. 3a illustrates one embodiment of the invention having permanent bonding between the bottom end of the side wall and the radially outwardly extending flange of the base closure part.

FIG. 5 shows a cylindrical container with an openable top in general accordance with an embodiment of the invention.

DETAILED DESCRIPTION OF DRAWINGS

Figure 1:
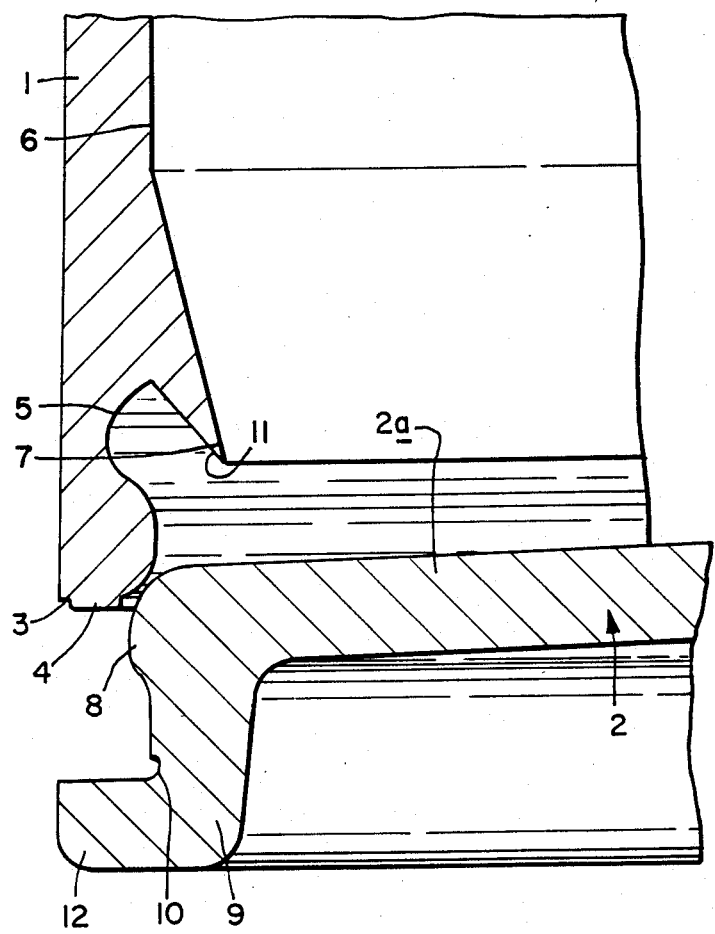
FIG. 1 is a cross section through portions of a wall part and base closure part for a first embodiment of the container assembly according to the invention and shows the parts before assembly.
Figure 2:
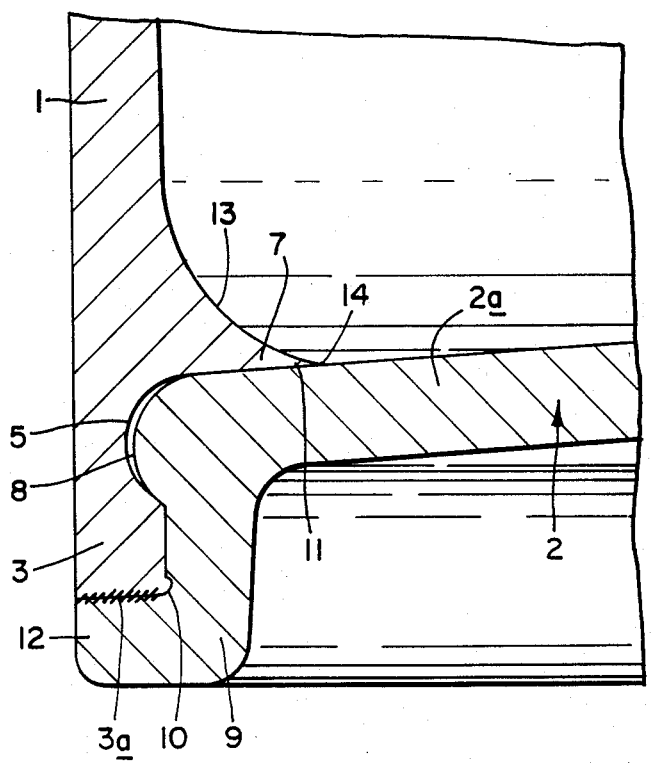
FIG. 2 is a cross section through the portions of the wall and closure parts of FIG. 1 assembled to form the container.

The container assemblies which are partly illustrated have their components moulded in semi-rigid plastics such as polypropylene and are intended to be suitable for use in the storage of paint. In the embodiment of FIGS. 1 and 2 the assembly comprises a cylindrical tubular side wall 1 and a circular base closure part or end cap 2. Before assembly a bottom end 3 of the wall 1 has a raised annular bead 4, as shown in FIG. 1, extending uniformly around the bottom end face. Adjacent the bottom end of the wall 1 is an annular internal groove 5. Located adjacent to the groove 5 and on the side of that groove remote from the end 3 (that is above the groove 5) is an annular internal sealing flange 7 which projects downwardly from the inner surface 6 of the side wall towards the bottom end of that wall into which the end cap 2 is to be fitted. The sealing flange 7 is tapered so that its thickness reduces uniformally towards its distal edge and this flange has an abutment face 11 which is continuous with the surface of the groove 5. In an unstressed condition, as shown in FIG. 1, the sealing flange 7 extends generally at an angle in the order of 30° relative to the wall 1 to project over the groove 5.

The closure cap 2 has a substantially flat bottom wall 2a which will extend in a radial plane of the side wall 1 to close the bottom of the container. The cap 2 includes a tubular extension wall 9 which extends downwardly from the closure wall 2a. The extension wall 9 has at its lowermost end a radially outwardly extending flange 12 which is intended to overlie the bottom end face of the side wall 1 and provide a bottom surface on which the container will stand. Coplanar with the bottom wall 2a on the closure cap is a radially extending annular rib 8 which is intended to be received in the annular groove 5. A small external annular recess 10 is provided on the closure cap 2 at the internal corner of the L-shaped section formed between the flange 12 and extension wall 9.

To assemble the container, the closure cap 2 is aligned with the bottom of the cylindrical wall 1 as shown in FIG. 1 and pressure applied to force the cap into the wall tube with the annular rib 8 leading. During this assembly the rib 8 of the end cap moves over the lower end of the wall 1 to snap engage in the annular groove 5 as a tight sealing (but not necessarily complementary) fit as shown in FIG. 2. During this assembly the face 11 of the sealing flange 7 abuts the inner face of the closure wall 2a and the sealing flange is thereby displaced so that its face 11 is in face-to-face contact with the surface of the bottom wall 2a to provide a fluid seal therewith. It will be noted from FIG. 2 that with the sealing flange 7 in its displaced or stressed condition, its face 11 is continuous with the surface of the groove 5 and the face-to-face contact between the face 11 and the flat inner face of the bottom wall 2a provides a relatively large sealing area. In addition, the stressing of the flange 7 during assembly of the container displaces the flange so that its inner surface presents a smoothly curved concave profile 13 and its tapered shape provides a smooth transition 14 from the inner surface of the sealing flange 7 to the inner surface of the closure wall 2. These latter features 13 and 14 will facilitate removal of paint by brush from the bottom internal corner edge of the container. With the rib 8 engaged in the groove 5, the flange 12 closely overlies the bottom end face formed by the annular bead 4 on the side wall 1. The bottom end 3 of the side wall is now permanently bonded to the flange 12 of the closure cap 2 by ultrasonic welding as shown at 3a. During this welding the material formerly creating the bead 4 becomes distributed over the flange 12 and any excess material can be accommodated in the recess 10. The bond formed by the weld extends around the entire periphery of the closure cap 2 to provide further sealing between the components. Although it is preferred, welding or other permanent bonding of the flange 12 to the side wall 1 is not essential as the fluid sealing effect of the rib 8 engaging in the groove 5 and also the abutment of the face 11 with the closure wall 2a should be adequate for a relatively viscous fluid such as paint. Also, if the flange 12 closely overlies the bottom face of the wall 1 to abut that face a sealing effect will be provided which will naturally be improved when the container assembly stands on the flange 12 by the load from the side wall 1, (particularly if several filled container assemblies are stacked one above the other).

Figure 3:
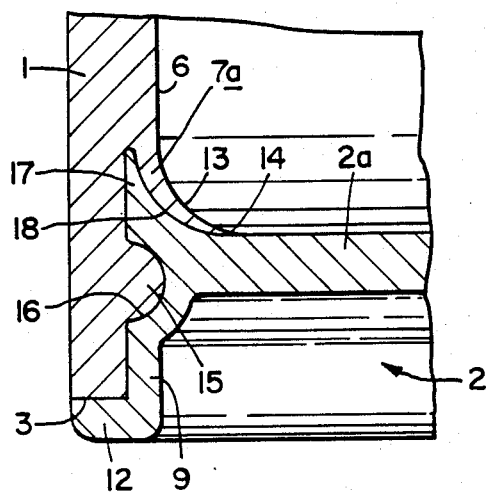
FIGS. 3 and 4 are similar cross sections to that shown in FIG. 2 and illustrate different arrangements of the manner in which the closure part may be fitted to the tubular wall part for container assemblies constructed according to the invention.
Figure 4:
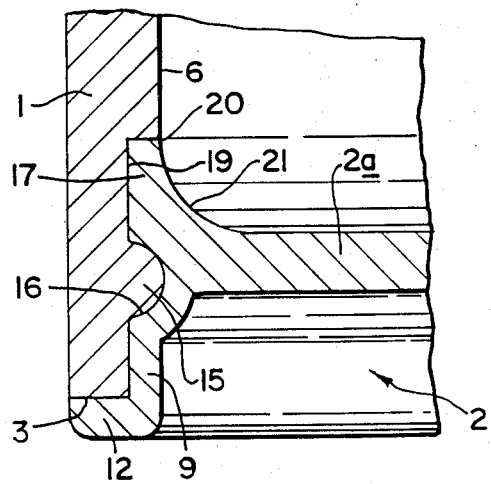

In the embodiment of FIGS. 1 and 2 the annular rib 8 on the closure end cap 2 engages within an annular groove 5 in the side wall 1 but in the embodiments of FIGS. 3 and 4 the groove and rib are effectively reversed whereby an internal annular rib on the side wall 1 snap-engages with a substantially complementary external annular groove 16 on the bottom closure cap 2. By this arrangement it will be seen that there is no unnecessary weakening of the side wall 1 by the formation of an annular groove therein; furthermore, by locating the rib 15 and groove 16 so that they engage substantially in the plane of the bottom closure wall 2a, it will be seen from FIGS. 3 and 4 that substantial plastics material is available within which to form the groove 16. Also in both embodiments of FIGS. 3 and 4 the bottom closure cap 2 is provided with an upward tubular extension 17 which is located within a complementary recess in the side wall 1. More particularly, in FIG. 3 the side wall 1 has a peripheral sealing flange 7a which extends downwardly in a similar manner to the flange 7 in FIG. 1 so that there is formed beneath the flange 7a and with the adjacent surface of the side wall a peripheral recess 18 which is complementary to the upward extension 17 on the cap 2. By this arrangement when the rib 15 and groove 16 are snap engaged, the extension wall 17 moves into close co-operation with the complementary recess 18. The sealing flange 7a is in face-to-face abutment with the extension wall 17 while the flange 12 abuts the bottom face of the side wall 1 to provide effective fluid seals. Similarly to the embodiment of FIG. 2, from FIG. 3 it will be seen that the sealing flange 7a again provides the smoothly curved concave profile 13 and the smooth transition at 14 between the inner surfaces of the walls 1 and 2a. FIG. 3a illustrates that the bottom end 3 may be bonded at 3b to the radially outwardly extending flange 12 of the closure part 2.

In the embodiment of FIG. 4 the upward wall extension 17 of the bottom cap is received in a complementary annular recess or rebate 19 in the inner surface 6 of the wall 1 so that the cylindrical surface 6 of the wall is flush with the inner surface of the extension wall 17 to provide a smooth transition 20 between those surfaces. In addition the upward extension wall 17 projects from the bottom closure wall 2a to present a smoothly curved concave profile 21 on the closure cap around the bottom internal corner of the container. The abutment of the flange 12 on the bottom face of the side wall, the snap engagement of the rib 15 with groove 16 and the contacting faces between the upward extension wall 17 and the rebate 19 will provide effective fluid seals.

In both embodiments shown in FIGS. 3 and 4 the natural resilience of the plastics material is likely to bias the fluid sealing surfaces into engagement with each other and thereby provide effective sealing without the necessity for permanent bonding (such as welding between the shoulder 12 and side wall) although it will be realised that such permanent bonding can be provided. In FIG. 5, a cylindrical container in accordance with the invention is shown and generally designated 40. The re-circular base closure part 2 may be bonded to the cylindrical side wall 1 at 3b in a manner similar to that illustrated in FIG 3a. It will be apparent that the base 2 may also be attached to the side wall as shown in FIG. 3. An openable lid 30 is shown in position to be fitted onto the open top of the container 40. Of course, an embodiment without a top, a non-cylindrical container and no bonding between the side wall 1 and base 2 is also possible as discussed above without departing from the spirit of the invention

I claim:

1. A plastics container assembly having an upstanding side wall and a base and which consists of a tubular wall part and a base closure part fitted to a bottom end of the wall part; one of the parts having a peripheral rib and the other part having a peripheral groove within which the rib is received to provide a fluid seal, said tubular wall part being held in snap-together engagement contact with said base closure part; one of said parts having a peripheral flange which closely overlies a peripheral bottom end face of the other part, and wherein inner surfaces of the wall part and closure part provide a smooth transition from one surface to the other and the effective peripheral junction within the container between the base and the side wall presents a smoothly curved concave profile.

2. An assembly as claimed in claim 1 in which the peripheral rib is a snap engagement within the peripheral groove.

3. An assembly as claimed in claim 1 in which the wall part and closure part are permanently bonded together.

4. An assembly as claimed in claim 3 in which the bonding is by adhesive or welding.

5. An assembly as claimed in claim 3 in which permanent bonding is provided between the peripheral flange and the bottom end face which it overlies.

6. An assembly as claimed in claim 1 in which the peripheral flange is external and located on the closure part to overlie the bottom end face of the wall part.

7. An assembly as claimed in claim 1 in which the closure part comprises a bottom wall which extends substantially. over the bottom of the interior of the container and a tubular extension wall which extends downwardly from the bottom wall within and adjacent to the tubular wall part.

8. An assembly as claimed in claim 7 in which the peripheral flange is external and located on the closure part to overlie the bottom end face of the wall part and said peripheral flange is located at the bottom of the tubular extension wall of the closure part.

9. An assembly as claimed in claim 1 in which the closure part comprises a bottom wall which extends substantially over the bottom of the interior of the container and said peripheral rib and groove engage substantially in the plane of said bottom wall.

10. An assembly as claimed in claim 1 in which the tubular wall part has an internal peripheral sealing flange adjacent to the closure part and which is directed from the side wall downwardly to the closure part, said sealing flange abutting the closure part to provide a fluid seal, to provide the smooth transition between the inner surfaces of the wall part and the closure part and to form at least part of the smoothly curved concave profile at the effective junction within the container between the base and the side wall.

11. An assembly as claimed in claim 10, in which the sealing flange reduces in its thickness to taper as it recedes from the side wall to provide said smooth transition.

12. An assembly as claimed in claim 10 in which the sealing flange is flexible.

13. An assembly as claimed in claim 12 in which the sealing flange is displaced into sealing abutment with the closure part during fitting of the closure part to the tubular wall part.

14. An assembly as claimed in claim 10 in which the closure part comprises a bottom wall which extends substantially over the bottom of the interior of the container and a tubular extension wall which extends upwardly from the bottom wall within and adjacent to the tubular wall part, and wherein a peripheral recess is formed in the tubular wall part beneath, and partly defined by, the sealing flange and said upward tubular extension wall is received within said peripheral recess whereby the sealing, flange overlies that upward extension wall.

15. An assembly as claimed in claim 14 in which the peripheral recess beneath the sealing flange receives the upward tubular extension wall in substantially complementary manner.

16. An assembly as claimed in claim 1 in which the tubular wall part is substantially cylindrical.

17. An assembly as claimed in claim 1 when fitted with an openable lid for the open top of the assembly.

18. A plastics container assembly having an upstanding side wall and a base and which consists of a tubular wall part and a base closure part fitted to a bottom end of the wall part;
- one of said parts having a peripheral rib and the other part having a peripheral groove within which the rib is received to provide a fluid seal;
- one of said parts having a peripheral flange which closely overlies a peripheral bottom end face of the other part;
- said tubular wall part having an internal peripheral sealing flange adjacent to the closure part, said sealing flange being directed downward from the side wall to abut the closure part so as to provide a fluid seal and a smooth transition between the inner surfaces of said wall and closure parts, said abuttment also forming at least part of a smoothly curved concave profile presented by the effective peripheral junction between the base and the sidewall within the container, and
- said closure part having a bottom wall extending substantially over the interior of the container bottom, a tubular extension wall extending upwardly from said bottom wall within and adjacent to the tubular wall part, said tubular wall part having a peripheral recess beneath and partly defined by the sealing flange, said upward tubular extension wall being receivable within said peripheral recess whereby the sealing flange overlies that upward extension wall.

19. An assembly as claimed in claim 18 in which the peripheral recess beneath the sealing flange receives the upward tubular extension wall in a substantially complementary manner.

* * * * *